United States Patent [19]

Lemmens

[11] Patent Number: 5,400,819

[45] Date of Patent: Mar. 28, 1995

[54] MEASURING AND REGULATING VALVE

[75] Inventor: Rudolphus P. M. Lemmens, Teteringen, Netherlands

[73] Assignee: Keystone International Holdings Corp., Houston, Tex.

[21] Appl. No.: 961,919

[22] PCT Filed: Jul. 3, 1991

[86] PCT No.: PCT/US91/04733

§ 371 Date: Mar. 5, 1993

§ 102(e) Date: Mar. 5, 1993

[87] PCT Pub. No.: WO92/01185

PCT Pub. Date: Jan. 23, 1992

[30] Foreign Application Priority Data

Jul. 9, 1990 [NL] Netherlands .................. 90/01562

[51] Int. Cl.⁶ .................. F16K 37/00; F16K 51/00
[52] U.S. Cl. .................. 137/556.3; 251/285; 73/198
[58] Field of Search ............... 137/556, 556.3, 556.6; 251/285; 73/198, 861.61, 861.62

[56] References Cited

U.S. PATENT DOCUMENTS

| | | | |
|---|---|---|---|
| 2,660,057 | 11/1953 | Ackley | 73/198 |
| 3,460,800 | 8/1969 | Mikuls | 251/285 X |
| 3,537,473 | 11/1970 | DeZurik, Jr. | 251/285 X |
| 3,575,378 | 4/1971 | Fawkes | 251/285 X |
| 3,877,677 | 4/1975 | Daghe et al. | 251/285 X |
| 4,671,109 | 7/1987 | Halmi | 73/198 |

FOREIGN PATENT DOCUMENTS

| | | |
|---|---|---|
| 0063530 | 10/1982 | European Pat. Off. |
| 2081038 | 11/1971 | France . |
| 8600247 | 8/1987 | Netherlands . |
| 653533 | 5/1951 | United Kingdom . |
| 2242726 | 10/1991 | United Kingdom . |
| 2247532 | 3/1992 | United Kingdom . |
| 9001650 | 2/1990 | WIPO . |

Primary Examiner—John Rivell
Attorney, Agent, or Firm—Browning, Bushman, Anderson & Brookhart

[57] ABSTRACT

Measuring and regulating valve assembly which includes a butterfly valve and a measuring flange, the measuring flange being situated upstream of the butterfly valve, the distance between the valve and the measuring flange being at least 0.6× the nominal passageway diameter, the assembly including a control box that has an adjustable stop that may contact a cam of a sleeve connected to an operating means whereby the maximum opening angle of the butterfly valve can be restricted in a reproducible manner, the sleeve being connected to the valve shaft.

21 Claims, 4 Drawing Sheets

MEASURING AND REGULATING VALVE

The invention refers to a measuring and regulating valve especially intended for use in the heating system of a large building, provided with a measuring flange with two connections for pressure gauges, said measuring flange being situated upstreams of the actual stop valve which may be moved into open and closed positions as well into intermediate positions with the aid of an operating means.

Well-known measuring and regulating valves of this type are usually provided with a plug of which the axis forms an angle of about 60° with the flow direction and are therefore quite long, for example 370 mm for a passageway of 100 mm. Then the plug is turned from the open to the closed position and vice versa via a spindle and a knob. Setting such a system involves balancing all resistances in the various lines, so that the minimally required flow rate is attained in every line.

In larger buildings there are often main lines that may each have several side lines. In this case regulation takes place step-by-step, i.e. first the side lines, then the main lines and then the total flow by means of the pump.

Measuring and regulating units based on a butterfly valve are taken less seriously than other, supposed better regulating principles such as plug valves. The combination of measuring flange with butterfly valve is considered to produce poor measuring and regulating characteristics, i.e. low measuring accuracy, a small range of regulation and imprecise to meter owing to the nature of the butterfly valve that has an asymmetric build-up of pressure in the case of partly open positions and, as a result of the short construction length, is placed too close to the measuring flange to enable precise measurements to be taken at said measuring flange.

Nevertheless, the known measuring and regulating valves have demerits that could be eliminated more or less easily if a butterfly valve were to be used anyhow. The main demerits are that the known valves require highly accurate handling in order to maintain the correct regulation set-up, that all the information concerning the setting must be read off from charts and that regulation can really only take place efficiently when two people are involved.

Surprisingly, it has turned out that a butterfly valve used for the purpose described above can still produce very good results if the distance between the valve and the measuring flange is minimally 0.6× the nominal passage-way and that, on said valve, a control box is arranged that comprises an adjustable stop that may come into contact with a cam on a sleeve of the operating means so as to restrict the maximum opening angle of the butterfly valve in an accurately reproducible manner, said sleeve being provided on the valve shaft and having an indicator.

With a nominal passage-way of 100 mm the intended distance therefore amounts to 60 mm, which results in an external length of about 120 mm. This is about 250 mm less than with the comparable measuring and regulating valve of the plug type.

The maximum opening angle of the butterfly valve is preferably adjustable in the area between approx. 75° and 20°, the position of 0° ranking as closed position, in which area the invented measuring and regulating valve shows excellent linear regulating characteristics as compared to well-known measuring and regulating valves of the plug type.

In the case of butterfly valves it is quite common for its angular position to be detectable from the outside. Naturally, the invented measuring and regulating valve also requires external visibility of the set position of the stop. One possibility to set the stop consists of the measures that the stop is provided with a horizontal threaded bore and that a screw, positioned in said threaded bore, is supported, in opposite side walls of a cap of the control box, in order to allow the stop to move recti-linearly through a groove in the bottom of the control box while the maximum opening angle is being set. External detection of the position of the stop can be obtained by the measures that the stop, at the side facing the valve shaft, is provided with a recess for a pin of a bounding plate that is mounted beneath the cap of the control box for pivotting around a bounding plate shaft, said shaft being aligned with the shaft of the butterfly valve.

With such a design it is practical for the indicator to be provided on the sleeve of the operating means at such a height that said indicator may move within a space of the cap of the control box, wherein said space is restricted downwardly by the top surface of a scale division that is provided on a partition that guides the stop at its bottom side and wherein said space is restricted upwardly by the bottom surface of the bounding plate.

At the side facing away from the indicator, the sleeve of the operating means can merge into a circle-segment-shaped plate with a circle-segment-shaped groove through which a locking screw extends that has been placed through a hole in the control box cap and has been screwed into the bottom of said control box.

In order to avoid the use of loose charts, nummerical data regarding the valve and the measuring flange are given on the cap of the control box.

The invention will be further elucidated below with reference to the drawings, in which, by way of example, an embodiment of a device according to the invention is shown. In the drawings.

Figure 1:
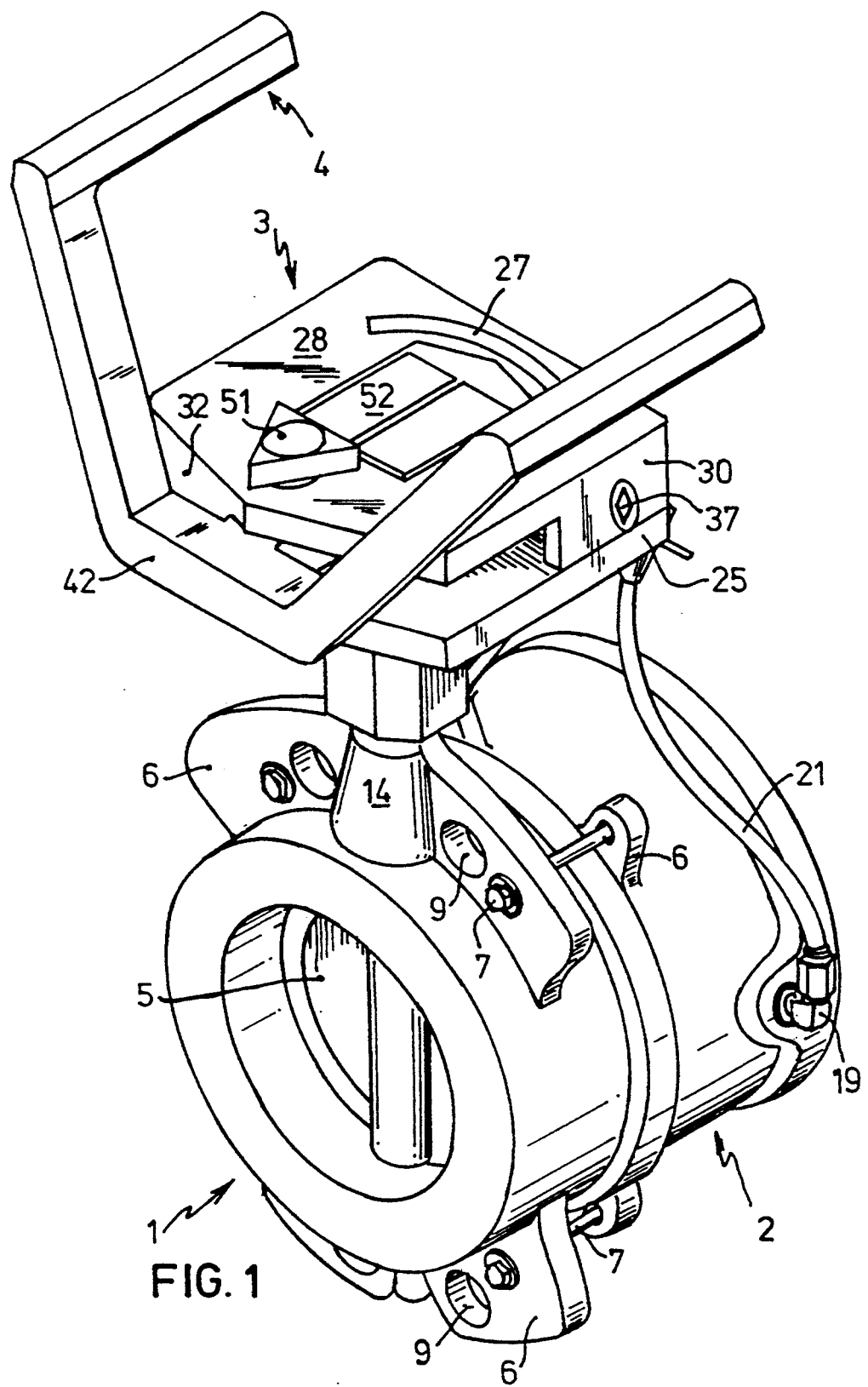
FIG. 1 shows a perspective view of the measuring and regulating valve.

The device shown in FIG. 1 mainly consists of a butterfly valve casing 1, a measuring flange casing 2 positioned upstreams of the butterfly valve casing 1, a control box 3 located above the butterfly valve casing 1, and an operating means 4 positioned in such a way that the butterfly valve 5 is closed, which is called the 0°-position of said valve.

Figure 2:
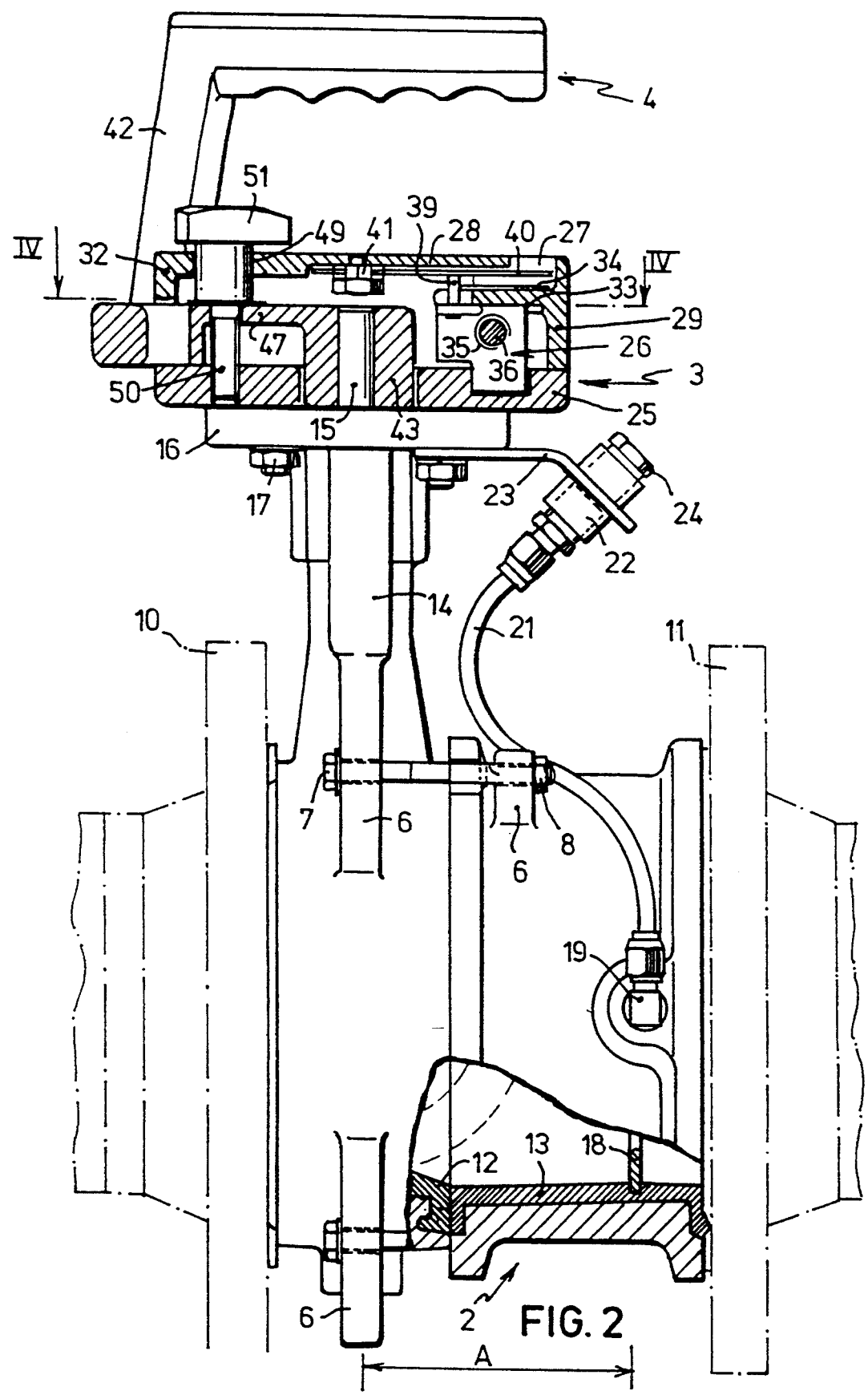
FIG. 2 shows a partly axially transected longitudinal view of FIG. 1.

The nominal passage-way of a measuring and regulating valve is defined as a diameter of a certain order of size in which there can be some conicity, yet of course without any steps. The distance that is of any relevance to the invention is the minimal distance of 0.6× the nominal passage-way, represented in FIG. 2 with A.

Figure 3:
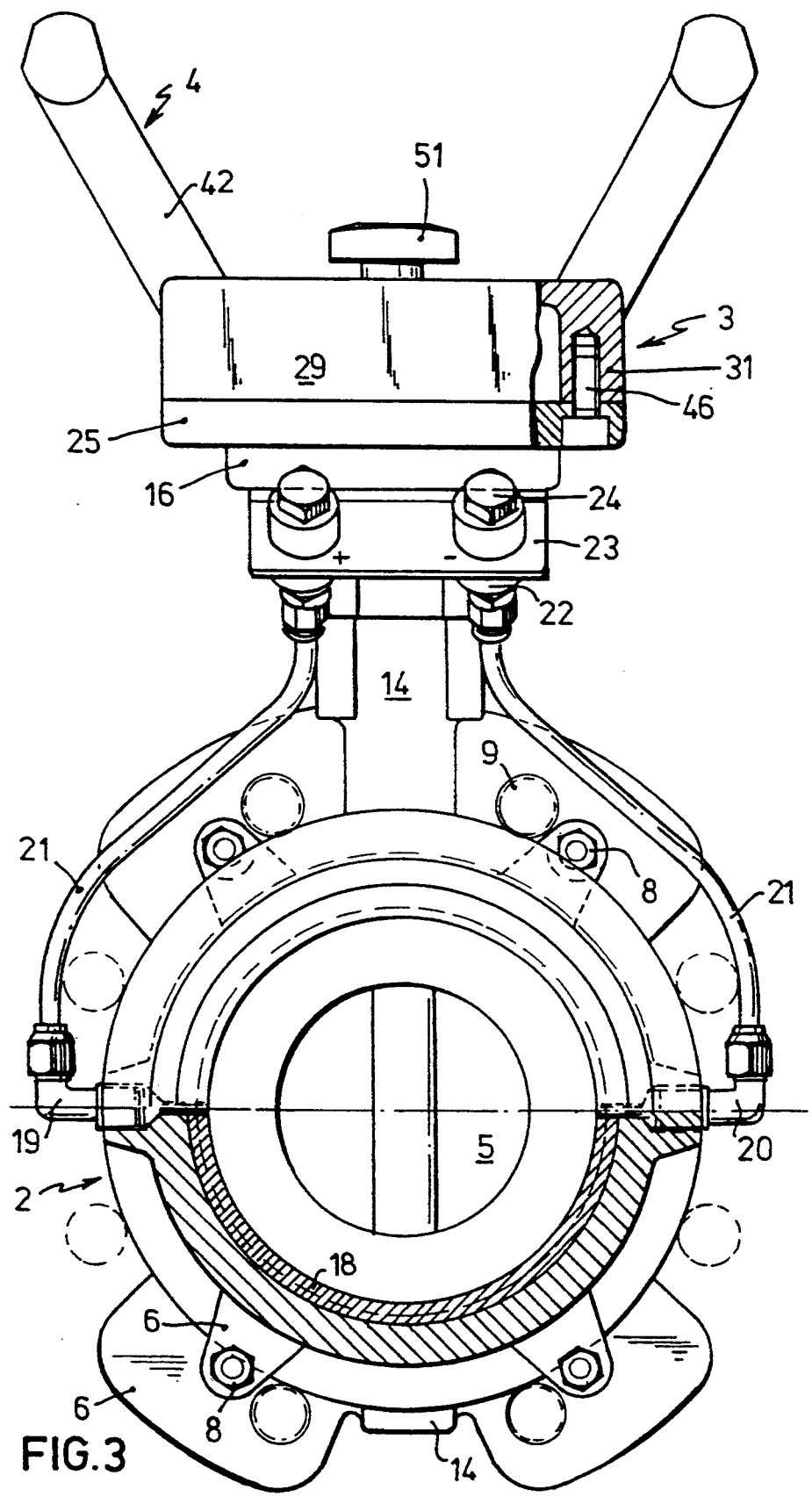
FIG. 3 shows a rear view of FIG. 1, showing a cross-section beneath the central axis at the position of the measuring flange.

The butterfly valve casing 1 and the measuring flange casing 2 are both provided with four ears 6, so that they may be attached to each other with the aid of screws 7 and nuts 8. In the ears 6 of the butterfly valve casing 1 there are relatively large holes 9 to allow (non-depicted) connecting means to pass, such as anchors with the aid of which the assembly of the butterfly valve casing 1 and the measuring flange casing 2 can be clamped between the pipe flanges 10, 11 (FIG. 2) of the heating system. FIG. 3 shows that there are eight anchors in all. The butterfly valve casing 1 as well as the measuring flange casing 2 are internally provided with a rubber lining 12 and 13 respectively.

Between the pairs of ears 6—located on top and at the bottom—of the butterfly valve casing 1 stubs 14 are provided in the usual manner, in which the shafts of the butterfly valve 5 may rotate. In the drawings only the upper butterfly valve 15 is visible in FIGS. 2 and 4. The upper stub 14 of the butterfly valve casing 1 is provided with a flange 16 (FIGS. 2 and 3) to which the control box 3 is attached by means of screw connections 17.

In the lining 13 of the measuring flange casing 2 a ring 18 is provided that is attached to a high pressure nipple 19 and a low pressure nipple 20 in the usual way. By means of small hoses these nipples 19 and 20 are connected to pressure gauge connections 22 on a kinked supporting plate 23 arranged beneath the flange 15 of the stub 14 of the butterfly valve casing 1. If no pressure difference gauge is present, as in the case described above, the connections 22 are sealed off by means of plugs 24.

The control box 3, which is of special importance to this invention, consists of a bottom 25 in which a straight groove 53 is provided to guide a stop 26, and a cap 28, provided with a reading slit, with a rear wall 29, two side walls 30 and 31 and a front wall 32. The side wall 30 and the front wall 32 leave a slit free in order to allow the operating means 4 to move back and forth at an angle of 75° (or 90° if the stop were to be removed). From the rear wall 29 a partition 33 projects in an inward direction from the control box 3, said partition guiding the stop 26 on its bottom side and having a round scale division 34 from 0° to 90° provided on its upper side.

The stop 26 is provided with a horizontal threaded bore 35 for a screw 36 that is rotatably supported in the side walls 30 and 31 of the control box 3 but is axially confined nevertheless. At an end that is accessible from the outside, the screw 36 is provided with a socket hole 37, so that the screw 36 can be turned with a (non-depicted) socket key in order to displace the stop 26 through the groove 53 in the bottom 25 of the control box 3.

The length of the groove 53 is such that the stop 26, at an opening angle of about 20°, is prevented from being moved further before the threaded bore 35 becomes wedged against the threaded part of the screw 36. It is therefore impossible to close the butterfly valve 5 completely with the aid of the stop 26. The regulating range, with its boundaries between about 75° and 20°, is larger and especially linearly better than is the case with valves of the usual type of plug.

At the side facing the butterfly valve shaft 15, the stop 26 is provided with a recess 38 for a pin 39 of a bounding plate 40 that is arranged beneath the cap 28 of the control box 3 for pivoting around a vertical axis 41. In view of the fact that said bounding plate 40 lies above the plane of cross-section in FIG. 4, it has been drawn there with chain-dotted lines. The vertical or bounding plate shaft 41 is aligned with the butterfly valve shaft 15. Therefore, when the stop 26 is moved recti-linearly, the bounding plate 40 is taken along and it then covers a more or less large angle area that borders on the maximum open position of 70°. Then the butterfly valve 5 cannot reach said area, as will be described below, and the position of the bounding plate 40 also clearly shows which area is meant; all the more if the bounding plate is painted in a striking colour, red for example.

Figure 4:
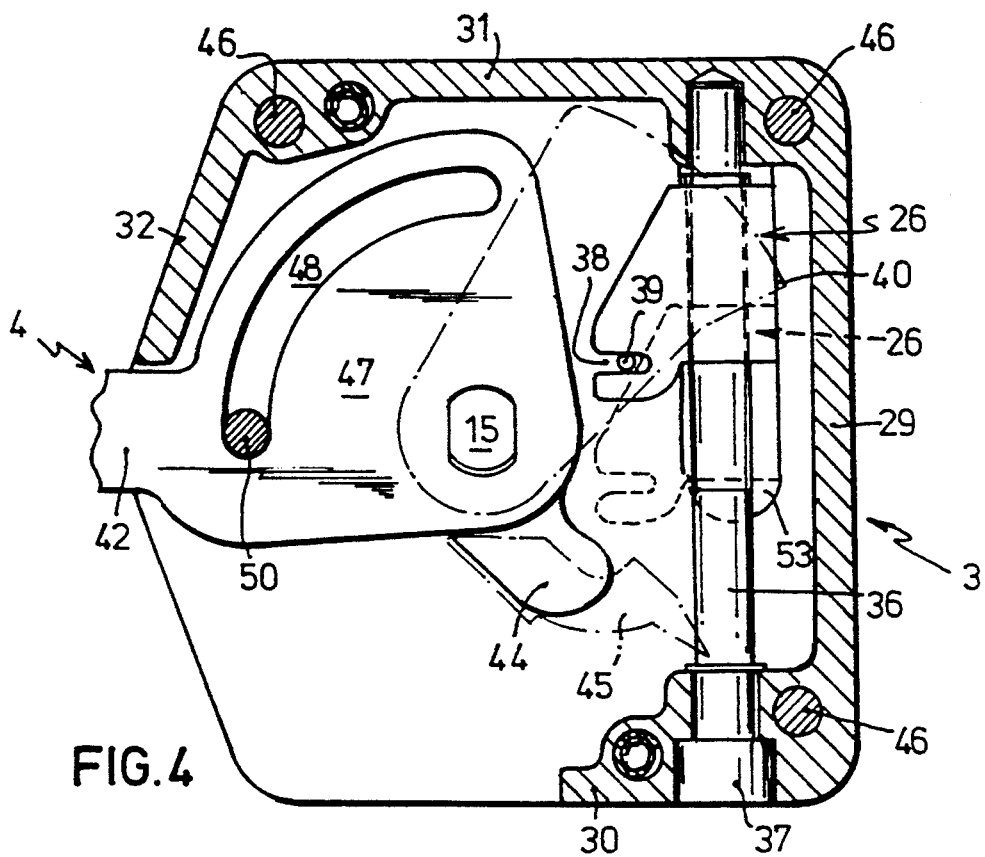
FIG. 4 shows, on a larger scale, a cross-section of the control box according to line IV—IV of FIG. 2.

In the depicted embodiment the control means 4 consists of a handle 42 that looks like the handlebars of a bicycle, said handle being connected with a sleeve 43 that is connected with the butterfly valve shaft 15 through a hole in the bottom 25 of the control box 3. FIG. 4 shows that this connection consists of a so-called double D-profile. The sleeve 43 comprises a cam 44 (FIG. 4) that abuts against the stop 26 when the valve 5 is closed. At a height that, in FIG. 2, lies between the scale division 34 and the bounding plate 40, an indicator 45 projects from the sleeve 43. This has been indicated too in FIG. 4, by means of chain-dotted lines as it lies above the plane of cross-section. It goes without saying, that the mutual positions of the cam 44 and the indicator 45 have been chosen in such a way that the indicator cannot come into the area of the scale division 34 covered by the bounding plate 40.

The bottom 25 and the cap 28 of the control box 3 are connected to each other by means of three socket bolts 46.

At the side facing away from the indicator 45, the sleeve 43 is provided with a circle-segment shaped plate 45 that has an also circle segment-shaped groove through which a lock screw 50 can move that has been inserted through a hole 49 in the cap 28 and has been screwed into the bottom 25. The circle-segment shaped groove 48 determines both the closed or 0°-position as well as the fully open or 90°-position of the butterfly valve 5, unless the latter position is restricted by the stop 26. By tightening the lock screw 50 with the said of a knob 51, the operating means 4 may be secured in a certain position.

Figure 5:
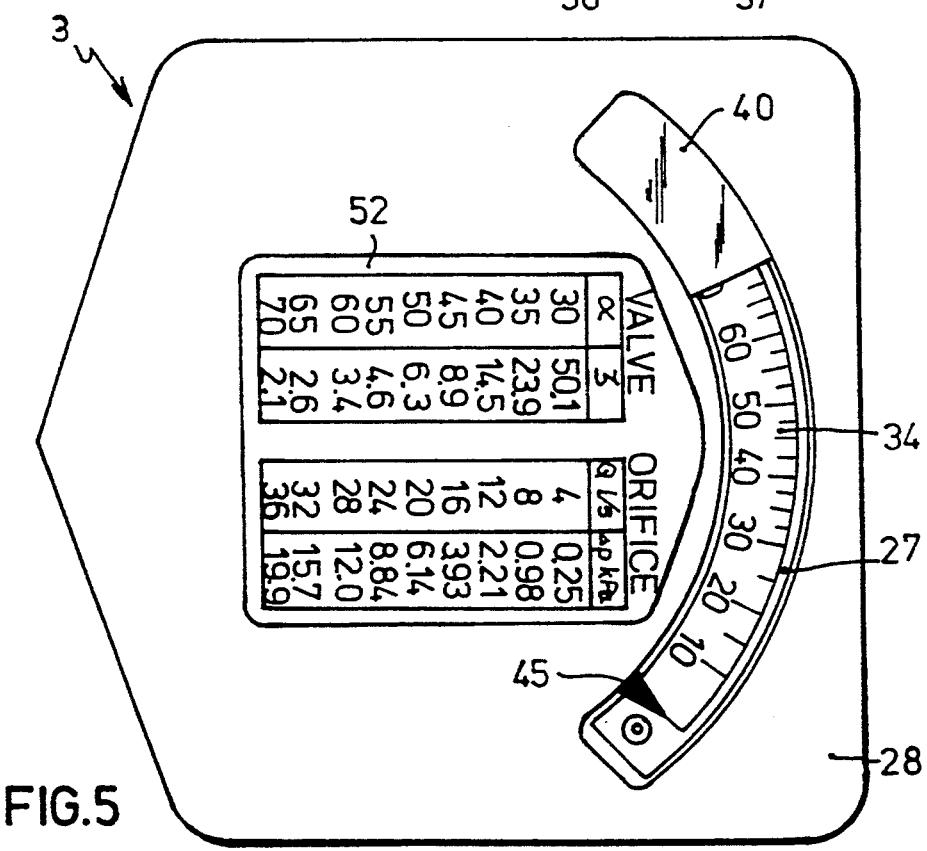
FIG. 5 shows an example of the charts on the control box.

As depicted in FIG. 5, on the cap 28 of the control box 3 charts 52 are provided for a duct with a passageway of 100 mm. It is remarked that "valve" stand for valve and "orifice" stands for measuring flange. Furthermore $\alpha$ = opening angle
$\zeta$ = resistance factor
$\phi$ = quantity of liquid in liters per second
$\Delta p$ = pressure difference factor in kPa.

It is therefore not necessary to have any graph at hand. In FIG. 5, in the area beyond 70°, no numbers can be read to show that at least the area beyond 70°–75° is covered by the bounding plate 40.

The invented measuring and regulating valve can be operated as follows:
if a heating system consists of several lines that must be measured and regulated individually, the amount of liquid needed per line with regard to the totally required heating capacity is already determined during the design phase, as well as the amount of liquid needed per line, with regard to resistances and loss of heat in ducts, valves, bends, lift heads and such on the one hand and the valve position that has to be set on the other hand. When the system has been fully installed, the regulation procedure is as follows:
The measuring and regulating valves are set at a position—calculated and varying per strand—by turning the stop 26 into the desired position with the aid of the screw 36 with socket hole 37, and by fixing the butterfly valve 5 against said stop by means of knob 51;

The pressure difference gauge is connected and the difference in pressure in read and compared to the desired Q-value of the chart 52 on the control box 3. If adjustment is necessary, the knob 51 is turned loose and the screw 36 is turned slowly in the desired direction until the difference in pressure on the pressure gauge corresponds to the calculated Q.

When this precise regulating procedure has been concluded, the valve is again secured by means of the knob 51;

Finally the other measuring and regulating valves of the remaining lines are set in the same way.

Other embodiments than the ones depicted in the drawing fall within the scope of the claims, in particular embodiments for use in process engineering.

I claim:

1. A measuring and regulating valve assembly, comprising:
    a stop valve (5) having a nominal passageway and moveable into open (90°), closed (0°) and intermediate positions with the aid of an operating means (14) for rotating a valve shaft (15);
    a measuring flange with connections for receiving a means for measuring a pressure differential across said flange, said measuring flange disposed upstream of said stop valve; and
    a control box (3) with an adjustable stop (26) for limiting the opening rotation of said operating means to restrict the maximum opening angle of said stop valve in an accurately reproducible manner, to any desired angle less than 90° said adjustable stop moveable recti-linearly through a plane substantially perpendicular to the axis of said valve shaft while the maximum opening angle is being set.

2. Valve assembly according to claim 1, characterized in that the maximum opening angle of said stop valve (5) is adjustable between approx. 75° and 20°, the position of 0° ranking as the closed position.

3. Valve assembly according to claim 1 characterized in that the angular positions of said stop valve (5) and the stop (26) on the control box (3) are visually detectable.

4. The valve assembly of claim 1 further comprising a rotatable screw (30) in said control box along which said stop is movable in said plane.

5. The valve assembly of claim 4 further comprising a groove (53) in said control box through which said stop is movable along said screw.

6. The valve assembly of claim 5 wherein said control box further comprises a threaded bore (35) through which said screw passes, and a cap (28) having opposite side walls (30,31) in which said screw is supported and wherein said groove is disposed in the bottom (25) of said control box.

7. Valve assembly according to claim 6 characterized in that numerical data (52) regarding the valve and the measuring flange are given on the control box (28).

8. The valve assembly of claim 6 further comprising an indicator (45) for visually detecting the rotational position of said valve shaft and thus the current angular position of said stop valve.

9. Valve assembly according to claim 8, characterized in that the stop (26), at the side facing said valve shaft (15), is provided with a recess (38) for a pin (39) of a bounding plate (40) that is mounted beneath the cap (28) of the control box (3) for pivoting around a bounding plate shaft, aligned with the shaft (15) of the stop valve.

10. Valve assembly according to claim 9, characterized in that the indicator (45) is provided on the operating means (4) at such a height that said indicator may move in a space of the cap (28) of the control box (3), wherein said space is restricted downwardly by the top surface of a scale division (34) that is provided on a partition (33) that guides the stop (26) at its bottom side and wherein said space is restricted upwardly by the bottom surface of the bounding plate (40).

11. Valve assembly according to claim 8, characterized in that a sleeve (43) of the operating means (4), at the side facing away from the indicator (45), merges into a circle-segment-shaped plate (47) with a circle-segment-shaped groove (48) through which a locking screw (50) extends that has been placed through a hold (49) in the control box cap (28) and has been screwed into the bottom (25) of said control box.

12. Valve assembly according to claim 8, wherein the maximum opening angle setting provided by the adjustable stop (26) is visually detectable on a scale division (34) functionally positioned with respect to the indicator (45).

13. The valve assembly of claim 1 wherein the distance between said valve stop and said measuring flange is at least 0.6× said nominal passageway.

14. The valve assembly of claim 1 wherein said stop valve is a butterfly valve.

15. A method of adjusting the maximum opening angle of a measuring and regulating valve assembly comprising a stop valve (5) having a nominal passageway and moveable into open (90°), closed (0°) and intermediate positions with the aid of an operating means (14) for rotating a valve shaft (15), and a measuring flange with connections for receiving a means for measuring a pressure differential across said flange, said measuring flange disposed upstream of said stop valve, the method comprising:
    providing a rotating valve (15) as the stop valve;
    providing a control box (3) with an adjustable stop (26) for limiting the opening rotation of said operating means to restrict the maximum opening angle of said stop valve in an accurately reproducible manner to any desired angle less than 90°; and
    moving said adjustable stop recti-linearly through a plane substantially perpendicular to the axis of said valve shaft from an initial position adjust to the desired maximum opening angle.

16. The method as defined in claim 15, further comprising:
    providing a visual indication of both the maximum opening angle of the butterfly valve and the current angular position of the butterfly valve.

17. The method as defined in claim 15, further comprising:
    initially setting the adjustable stop such that the maximum opening angle is at an initial selected position;
    while passing fluid through said measuring flange of said valve assembly, detecting the pressure differential across said measuring flange; and
    adjusting the initial setting of said adjustable stop in response to the differential pressure to obtain the desired maximum opening angle of said rotating valve.

18. The method as defined in claim 17, further comprising:
  providing a visual indication of the open, closed and intermediate positions of said rotating valve.

19. The method as defined in claim 17, further comprising:
  carrying said adjustable stop on a screw (30) mounted in a groove (53) in said control box; and
  rotating said screw to recti-linearly move said adjustable stop through said plane.

20. The method as defined in claim 17, further comprising providing a butterfly valve as the stop valve.

21. The method as defined in claim 17, further comprising limiting the maximum opening angle of said stop valve between approximately 75° and 20°.

* * * * *